UNITED STATES PATENT OFFICE.

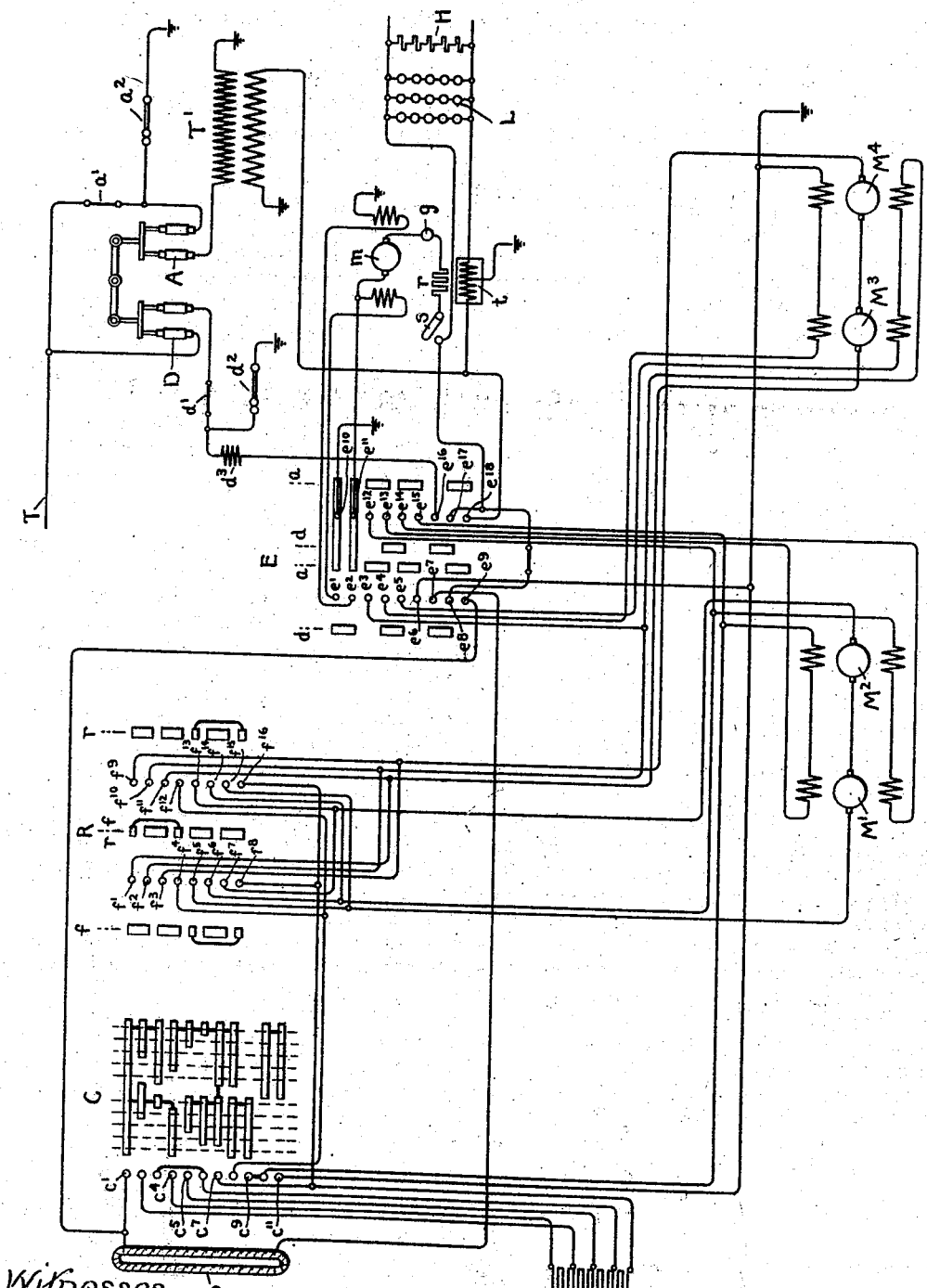

WILLIAM B. POTTER, OF SCHENECTADY, NEW YORK, ASSIGNOR TO GENERAL ELECTRIC COMPANY, A CORPORATION OF NEW YORK.

MOTOR-CONTROL SYSTEM.

No. 808,778.        Specification of Letters Patent.        Patented Jan. 2, 1906.

Application filed August 10, 1904. Serial No. 220,161.

*To all whom it may concern:*

Be it known that I, WILLIAM B. POTTER, a citizen of the United States, residing at Schenectady, county of Schenectady, State of New York, have invented certain new and useful Improvements in Motor-Control Systems, of which the following is a specification.

My invention relates to the control of electrical vehicles driven by motors adapted for operation on both direct and alternating currents.

It is sometimes desirable to employ a high-tension alternating current over a portion of the length of an electric railway—as, for instance, in the country or over private rights of way—and to employ low-tension direct current over other portions, as within the confines of cities. Certain types of motors—as, for instance, the well-known series motor—may be designed for operation on either alternating or direct current. The voltage which may with impunity be impressed upon such alternating-current motors is very much lower than the voltage which may advantageously be impressed upon a direct-current motor. Thus while for ordinary railway-work the direct-current supply is about six hundred volts the alternating-current voltage which may be efficiently employed is only about two hundred, at which point difficulties in commutation begin to arise. Line-currents cannot be efficiently employed at so low a direct-current voltage as that to which alternating-current motors are limited. Although it is difficult to design such motors for operation on six hundred volts alternating current, it is quite practicable to so design them that they will operate successfully and efficiently on two hundred volts alternating current and three hundred volts direct current. Consequently if the high-tension alternating current is reduced to a voltage of about four hundred by means of a transformer then by connecting two such motors to operate in series the equipment is adapted to both the ordinary line voltage for direct current and the alternating-current voltage.

In adapting the car equipment for use on both alternating and direct current suitable switches may be provided for connecting the motors either directly with the trolley or for connecting the trolley to the primary of the transformer, in which latter case the motors are connected with the secondary of the transformer, the transformer being of course cut out of circuit when the motors are connected directly to the trolley for receiving direct current.

The above-mentioned change in circuits is not all that is required in a system of this character, for the reason that if a series motor is designed for operation on a system of alternating-current voltage and is then connected to a direct-current source of the same voltage the motor will be heavily overloaded, since the motor then possesses no self-induction and the entire impressed voltage must be balanced by the counter electromotive force developed in the motor-armature—that is, both the current flow and the speed will increase. When the direct-current voltage is not equal to the alternating-current voltage, but is greater—as, for instance, when two hundred volts alternating and three hundred volts direct per motor are employed—the overload will be still more serious. Consequently in changing from alternating to direct currents the motor-field should be strengthened so as to increase the counter electromotive force per ampere. This may be accomplished in a simple manner by connecting the two poles of the field in parallel for alternating current and in series for direct current. The motor system just described forms no part of the present invention, broadly speaking, but is set forth and claimed in Patent No. 783,124, granted February 21, 1905, on an application filed by Maurice Milch.

For operating large and heavy cars successfully and at high rates of speed it is necessary to employ more than two of the motors which have just been described, and it is desirable in accelerating the motors that they should first be connected all in series, so that each motor has a low terminal voltage, and then in parallel, whereby they receive their full voltage.

One object of the present invention is to devise an equipment of motors and controlling means therefor whereby the usual series and parallel motor groupings may be carried out to some extent during acceleration of the motors.

To this end the present invention contemplates the arrangement of the motors in groups, each group comprising, preferably, two motors, and so arranging the controller that the various groups are treated as units which are first connected in series with all resistance in circuit, the resistance being then cut out step by step, then connecting the groups in parallel with all resistance in circuit, and finally again cutting out the resistance step by step, thereby leaving the groups of motors arranged in parallel and having a maximum terminal voltage.

Electrically-operated vehicles are ordinarily lighted and heated by the power-current. Obviously if the alternating-current voltage is different from the direct-current voltage the lights will not operate satisfactorily.

Another feature of my invention consists in providing means controlled by the switch which varies the field strength of the motor for varying the voltage impressed upon the lamps relative to the terminal voltage of the motors. In this way the lamp voltage may be maintained constant whether the motors are operating on direct or alternating current.

Where the car is provided with a motor-driven air-compressor for an air-brake system, the same changes must be made in the circuit connections for this motor as those which are required for the car-motors themselves.

A further feature of my invention consists in so arranging the contacts of the switch for varying the field strength for the driving-motors that the field strength of the air-compressor motor is simultaneously varied in the proper manner.

It is customary to employ a blow-out coil or coils for interrupting the arcs that may occur at the controller-contacts upon making changes in the motor-circuits where direct current is impressed on the motors. When alternating current is used, a blow-out coil is not essential, particularly when the alternating-current voltage is lower than the direct-current voltage. Moreover, a blow-out coil energized by alternating current would have little effect and if left in circuit would require a laminated core to obviate dangerous heating.

A further feature of my invention consists in providing means for cutting out the blow-out coil or coils when the motors are connected for operation on alternating current.

Other features of the present invention will appear in connection with the following description thereof.

In the accompanying drawing I have shown diagrammatically one system by which the present invention may be carried out; but it is of course understood that the details of the arrangement illustrated may be varied in many ways without changing the character of the invention.

Similar reference characters will be used to denote corresponding elements throughout the specification and in the drawing.

The particular form of system illustrated is one adapted for a four-motor equipment, and $M'$, $M^2$, $M^3$, and $M^4$ represent the four driving-motors of the car arranged in two groups of motors, each connected in series. By means of the series connection the terminal voltage of the motors is made only half the voltage of the motor-circuit, and by transforming the alternating-current line voltage down to approximately four hundred volts the motor can be designed to run efficiently both on alternating-current and under the ordinary direct-current line voltage.

C represents a controlling-switch for the motors arranged to connect the two groups of motors in series and in parallel and to regulate the amount of resistance I which is included in the motor-circuit.

B represents the usual blow-out coil for the controller.

R indicates the reversing-switch, by means of which the relative connections of fields and armatures may be reversed in order to reverse the direction of movement of the car or other vehicle. The field of each motor is shown as divided into two parts, which are connected to the switch E, which I shall hereinafter call the "commutating switch," and which acts to connect the two portions of the field either in series or in parallel, according as the impressed current is direct or alternating. The commutating switch E also serves to connect the motors and the controlling-switch C to the secondary of the transformer T' or to the switch D, according to the position in which the commutating switch is placed. The primary of transformer T' is connected to switch A.

T represents the trolley or other source of current, which is connected both to switch D and to the switch A. It is seen, therefore, that if switch D is closed trolley T is connected directly through the commutating switch E to the motor-circuits, while if switch A is closed the trolley is connected through the primary of the transformer to earth.

The switches A and D are preferably mounted upon a single handle or otherwise interlocked, so that when one is closed the other cannot be closed, but must remain open. This construction is represented diagrammatically in the drawing, but forms no part of the present invention, it being set forth and claimed in an application filed by Jesse S. Pevear, Serial No. 220,166, filed on the 10th day of August, 1904.

A fuse $a'$ and a lightning-arrester $a^2$ of any usual or preferred forms are adapted on the alternating-current voltage and a fuse $d'$, lightning-arrester $d^2$, and choke-coil $d^3$ are adapted for use on the direct-current voltage.

$m$ represents an auxiliary motor for driving an air-compressor, and this motor is also connected to contacts on the commutating switch E, $g$ and $s$ represent, respectively, a governor for the motor $m$ and a switch whereby the circuit of the motor $m$ may be opened or closed.

Since this motor $m$ is small and operates only intermittently, it is possible to design it to operate under substantially the whole impressed electromotive force. A resistance $r$ is placed in the circuit of this motor to prevent overloading on direct current.

L represents lamps, and H heating-coils, one circuit-terminal of which is connected to the commutating-switch E and the other terminal to one terminal of the compensator $t$. The other terminal of the compensator $t$ is connected to a contact on the commutating switch, while an intermediate tap is connected to the earth.

The operation is as follows: Assume that the switch D is closed, thereby opening switch A and connecting trolley T to contact $e^{16}$ of the commutating switch; assume also that the commutating switch is in the position to bring the movable contacts on the line $d\ d$ into engagement with the stationary contact-fingers, and assume, further, that reversing-switch R is in its forward position—that is, with the movable contacts on the line $f$ and $rf$ in engagement with the stationary contact-fingers. Now let the controlling-switch C be moved to its first position, as indicated by the first dotted line. The circuits are now as follows: trolley T, switch D, contact $e^{16}$, contact $e^{17}$, contact $e^1$, contact $e^7$, blow-out coil B, contact $c'$, contact $c^4$, resistance I, contacts $f^8\ f^{16}$, contacts $f^5$ and $f^{15}$, armature of motor M', armature of motor M², contacts $f^{13}$ and $f^7$, contacts $f^6$, $f^{14}$, through the lower halves of the fields of motors M² and M', contacts $e^{14}$, contact $e^{13}$, through the upper halves of the fields of motors M' and M², contact $c^9$, contact $c^8$, contacts $f^4$ and $f^{12}$, contacts $f^3$ and $f^9$, through armatures of motors M⁴ M³, contacts $f^{11}\ f'$, contacts $f^{10}$ and $f^2$, through the lower halves of the fields of motors M⁴ and M³, contact $e^5$, contact $e^4$, upper halves of the fields of motors M³ and M⁴, to ground. The motors are therefore connected all in series with each other, with the two portions of the field of each motor in series. A further current may be traced as follows: starting from switch D and passing to contact $e^{16}$, contact $e^{17}$, through lamps L and heating-coils H, through a portion of compensator $t$ to ground. The lamps and heating-coils are thus connected directly between a line and the ground, the portion of the compensator $t$ having no effect, since the car is operating upon direct current. If switch $s$ is closed, a still further circuit may be traced—namely, from switch D, contact $e^{16}$, contact $e^{17}$, switch $s$, governor $g$, armature of motor $m$, left-hand half of field of motor $m$, contact $e'$, contact $e^2$, through the right-hand half of the field of motor $m$ to ground. The compressor-motor is thus connected across the line with the two portions of its field in series. The circuits just described are those when the controller is in its first running position, the motors being connected in series with all resistance in circuit therewith. As the controller is moved to and through its successive running positions in the usual manner the resistance I is cut out step by step until the two motors remain connected in parallel with no resistance in circuit. Since this is the usual manner in which acceleration of the motors is produced and since the motor-controller may be of any desired construction, the various circuits need not be traced in detail, but are evident from the drawings. If it is now desired to run the motors on alternating current, the switch D is opened, the commutating switch E is moved to the position in which the movable contacts on the line $a\ a$ are brought into engagement with the stationary contact members, and then the switch A is closed. Thus the trolley T is connected directly to the primary of transformer T'. Starting now from the right-hand terminal of the secondary of transformer T', the motor-circuit is as follows: contact $e^{18}$-$e^{17}$, contact $e^8$, contact $e^9$, contact $c'$, contact $c^4$, resistance I, contacts $f^8\ f^{16}$, contacts $f^5$ and $f^{15}$, through the armature of motor M', armature of motor M², contacts $f^{13}$ and $f^7$, contacts $f^{14}$ and $f^6$. Here the current divides, part going through the lower halves of the field of motors M' and M² and through contacts $e^{14}\ e^{15}$ and the other part going through contacts $e^{12}\ e^{13}$ and through the upper halves of the fields of motors M' and M². The current then again unites, passing through contact $c^9$, contact $c^8$, contacts $f^4$ and $f^{12}$, contacts $f^3$ and $f^9$, armature of motor M⁴, armature of motor M³, contacts $f^{11}$ and $f'$, contacts $f^{10}$ and $f^2$. Here the current again divides, part passing through contact $e^3$, contact $e^4$, and the upper halves of the fields of motors M³ and M⁴ to the ground and the other halves passing through the lower halves of the fields of motors M⁴ and M³, contact $e^5$, contact $e^6$, to the ground. It is seen that the motors are now connected in series with each other with all the resistance in circuit, but with the parts of each field in parallel with each other. It will also be noticed that no branch of the circuit passes through blow-out coil B, which is therefore now idle. The compensator $t$ has its left-hand terminal connected to the right-hand terminal of the secondary winding of transformer T' and has its intermediate tap grounded. The terminal voltage of the compensator $t$ is consequently greater than that of the secondary of transformer T', and therefore if the compensator $t$ is properly proportioned the lamps L, which are connected across the terminals of the compensator through contacts $e^{17}$ and $e^{18}$, will be supplied with the same voltage as when they were connected to the direct-current source. The circuit of the compressor-motor may be traced as follows: from the right-hand terminal of the secondary of transformer T' through contact $e^{18}$, contact $e^{17}$, switch $s$, governor $g$, and an armature of motor $m$. Here the current divides, part passing through the left-hand portion of the field, contact $e'$ to the ground and the other portion passing through contact $e^{11}$, contact $e^2$, right-hand halves of motor-field to ground. The same changes have therefore been effected in the field connections of the compressor-motor as those which were made in the field connections of the driving-motors of the vehicle.

By the present system a single switch mechanism is adapted to change the field connections for both the driving and the auxiliary motors, and the arrangement is such that the only switches subject to high-potential strain when the car is running on alternating current are the switches D and A, which may readily be designed to withstand any desired voltage.

What I claim as new, and desire to secure by Letters Patent of the United States, is—

1. In combination, a plurality of groups of motors, each group comprising a plurality of motors permanently connected in series, said motors being adapted for operation on either direct or alternating current, means for supplying alternating or direct current to said motors, a switch adapted to connect said groups in series and in parallel and to vary the amount of resistance in the motor-circuit, and a switch adapted to vary the field strength of the motors.

2. In combination, a plurality of groups of motors adapted for operation on either direct or alternating current, means for supplying alternating current or direct current to said motors, a switch for connecting said groups in series and in parallel, and a switch for varying the field strength of the motors.

3. In combination, a plurality of groups of motors adapted for operation on either direct or alternating current, means for supplying direct or alternating current to said motors, a switch for connecting said groups in series and in parallel and for varying the amount of resistance in the motor-circuit, and means for producing a relative variation in the field strength of the motors when running on direct and on alternating current.

4. In combination, a plurality of groups of motors adapted for operation on either direct or alternating current, and means for supplying direct or alternating current to said motors, said means including a switch for varying the field strength of said motors and a switch for connecting said groups in series and in parallel and for determining the amount of resistance in the motor-circuit.

5. In a vehicle, a plurality of motors adapted for operation on either alternating or direct current, a transformer, two switches adapted to connect the source of current to said motors and to the primary of said transformer respectively, and a third switch adapted to vary the field strength of the motors and to connect said motors to the secondary of said transformer.

6. In a vehicle, driving-motors therefor, an auxiliary motor, all of said motors being adapted for operation on alternating or direct current, means for connecting the motors for operation on alternating or direct current, and a switch adapted to connect portions of the fields of all the motors in series and in parallel.

7. In a vehicle, driving-motors therefor adapted for operation on alternating or direct current, means for supplying the motors with alternating and direct currents of different voltages, lamps connected in shunt to the power-circuit, a voltage-changing device, and means for connecting said device in the lamp-circuit when the motors are connected for operation on alternating current.

8. In a vehicle, driving-motors therefor adapted for operation on direct or alternating current, means for supplying direct and alternating current of different voltages to said motors, a voltage-compensator having a point on its winding intermediate its terminals grounded, a lamp-circuit having one terminal connected to the source and the other to one terminal of said compensator, and means for connecting the other terminal of said compensator to the source when the motors are connected for operation on alternating currents.

9. In a vehicle, driving-motors therefor adapted for operation on alternating or direct current, means for supplying the motors with alternating and direct currents of different voltages, lamps connected in shunt to the power-circuit, a voltage-changing device, and a switch for decreasing the field strength of the motors and including said compensating coil in the lamp-circuit for operation on alternating current.

10. In combination, a plurality of motors adapted for operation on either alternating or direct current, a controlling-switch for said motors, a blow-out coil therefor, and means for cutting said coil out of circuit when the motors are connected for operation on alternating current.

11. In combination, a plurality of motors adapted for operation on either alternating or direct current, a controlling-switch for said motors, a blow-out coil therefor, and a switch arranged to vary the field strength of the motors and to cut said coil out of circuit.

In witness whereof I have hereunto set my hand this 8th day of August, 1904.

WILLIAM B. POTTER.

Witnesses:
BENJAMIN B. HULL,
MARGARET E. WOOLLEY.